US 6,660,793 B1

(12) United States Patent
McIntyre et al.

(10) Patent No.: US 6,660,793 B1
(45) Date of Patent: Dec. 9, 2003

(54) AQUEOUS COATING COMPOSITIONS HAVING IMPROVED TRANSPARENCY

(75) Inventors: Patrick F. McIntyre, West Chester, PA (US); Karyn B. Visscher, Voorhees, NJ (US); Kenneth S. Kirshenbaum, West Bloomfield, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 172 days.

(21) Appl. No.: 09/594,422

(22) Filed: Jun. 15, 2000

(51) Int. Cl.⁷ .................................................. C08K 3/08
(52) U.S. Cl. ....................... 524/441; 524/523; 524/538; 524/556; 524/562; 524/599; 524/515
(58) Field of Search ................ 524/515, 523, 524/538, 556, 562, 599, 441

(56) References Cited

U.S. PATENT DOCUMENTS

| | | | |
|---|---|---|---|
| 3,980,602 A | 9/1976 | Jakubauskas | 260/29.6 TA |
| 4,017,448 A * | 4/1977 | Panush | 260/31.4 |
| 4,332,354 A | 6/1982 | deMonterey et al. | 241/16 |
| 4,532,353 A | 7/1985 | Chupp et al. | 564/442 |
| 4,656,226 A | 4/1987 | Hutchins et al. | 525/93 |
| 4,719,121 A | 1/1988 | Kimball | 427/807 |
| 4,891,401 A | 1/1990 | Huybrechts et al. | 524/807 |
| 4,952,326 A | 8/1990 | Amjad et al. | 210/701 |
| 4,952,617 A | 8/1990 | Ayala et al. | 523/200 |
| 5,079,086 A | 1/1992 | Burns et al. | 428/329 |
| 5,084,502 A | 1/1992 | Buscall et al. | 524/457 |
| 5,231,131 A * | 7/1993 | Chu et al. | 524/504 |
| 5,466,286 A | 11/1995 | Briselli et al. | 106/404 |
| 5,502,113 A | 3/1996 | Antonelli et al. | 525/287 |
| 5,530,070 A * | 6/1996 | Antonelli et al. | 525/330.4 |
| 5,753,371 A | 5/1998 | Sullivan et al. | 428/406 |
| 5,756,594 A | 5/1998 | Funhoff et al. | 525/400 |
| 5,759,255 A | 6/1998 | Venturini et al. | 106/418 |
| 5,981,624 A | 11/1999 | Thetford et al. | 523/160 |
| 6,069,210 A | 5/2000 | Cartridge et al. | 525/409 |

FOREIGN PATENT DOCUMENTS

| | | |
|---|---|---|
| CA | 1102505 A | 6/1981 |
| CA | 2182899 | 8/1996 |
| DE | 2941807 B | 1/1981 |
| DE | 3641677 A | 12/1986 |
| JP | 7 701373 B | 4/1977 |
| JP | 52 087421 A | 7/1977 |
| JP | 54 002409 A | 1/1979 |
| JP | 57 143364 A | 9/1982 |
| JP | 61 166863 A | 1/1985 |
| JP | 61 227226 A | 4/1985 |
| JP | 62 149329 A | 12/1985 |
| JP | 63 209772 A | 2/1987 |
| JP | 4 290580 A | 10/1992 |
| JP | 5 025371 A | 2/1993 |
| JP | 6 220370 A | 8/1994 |
| SU | 1 655964 A | 6/1991 |

* cited by examiner

Primary Examiner—Peter D. Mulcahy
Assistant Examiner—William Cheung
(74) Attorney, Agent, or Firm—Steven C. Benjamin

(57) ABSTRACT

Transparent iron oxide pigment dispersions which produce waterborne coating compositions having excellent transparency and reduced haze are provided. The dispersions contain dispersed pigment, an aqueous carrier, and a mixture of water-dispersible acrylic copolymer dispersants, the mixture containing at least one acrylic copolymer dispersant having acid functional groups, at least one acrylic copolymer dispersant having phosphate functional groups, and optionally at least one acrylic copolymer dispersant having alkyl amino groups and preferably benzyl groups in the pigment anchoring segment. Such pigment dispersions are useful in forming automotive waterborne paints, particularly "metallic" automotive paints.

13 Claims, No Drawings ically include random, block and graft copolymers that have a pigment adsorbing segment that is attracted to the pigment surface and a stabilizing segment that extends into the surrounding solvent medium to provide entropic or steric stabilization of the pigment particles against flocculation and keep the pigments dispersed.

AQUEOUS COATING COMPOSITIONS HAVING IMPROVED TRANSPARENCY

BACKGROUND OF THE INVENTION

This invention relates to an aqueous coating composition and in particular to an aqueous coating composition containing a transparent iron oxide pigment dispersion formed with a synergistic mixture of acrylic copolymer pigment dispersants that has improved transparency and reduced haze.

The use of transparent iron oxide pigments in coating compositions used in particular for exterior finishes for automobiles and trucks to provide the finish with high transparency, glamour and aesthetic quality is well known. High film transparency is particularly important for automotive coatings containing metallic flake pigments, such as aluminum flake, as it is needed to impart high metallic luster to the finish. To obtain films of high transparency, the pigment it particles must be fully deflocculated and uniformly dispersed in the coating composition. Pigment dispersions stabilized with copolymer dispersants are generally used to disperse and maintain, in a dispersed state, transparent iron oxide pigments in coating compositions. Copolymer dispersants used to form such pigment dispersions are well known in the art and typically include random, block and graft copolymers that have a pigment adsorbing segment that is attracted to the pigment surface and a stabilizing segment that extends into the surrounding solvent medium to provide entropic or steric stabilization of the pigment particles against flocculation and keep the pigments dispersed.

There are relatively few problems with the addition of transparent iron oxide pigment dispersions to solvent based coating compositions, but in waterborne compositions, stabilization of transparent iron oxide pigments is a difficult task. In typical aqueous coating compositions, other particulate materials such as latex, other pigments, electrolytes, etc. compete for the iron oxide surface and have a tendency to displace the dispersing resin from the pigment surfaces, which causes the pigments to flocculate or cluster together and jeopardizes the pigment stability necessary to obtain high transparency and low haze in the final coating.

The stabilization of transparent iron oxide in waterborne systems therefore depends, at least in part, on the ability to have the dispersing polymer favorably associated with the pigment surface. The existing polymeric dispersing resins used to stabilize transparent iron oxide pigments in aqueous coatings compositions do not adequately meet this criteria. Such resins, which include acrylic copolymers having a hydrophobic adsorbing segment containing acid groups for enhanced interaction with the pigment surface and a hydrophilic stabilizing segment for aqueous solubility, as for example, as taught in U.S. Pat. No. 5,231,131 to Chu et al issued Jul. 27, 1993, incorporated by reference herein, produce stable aqueous transparent iron oxide pigment dispersions that have very good shelf life, but when the dispersions are added to aqueous coating compositions, they tend to undergo pigment flocculation and phase separation due to competing effects described above which result in poor paint stability, high haze, high viscosity, and ultimately coatings having diminished transparency and color strength.

Phosphated acrylic copolymer dispersants are also known in the art, as for example, as taught in U.S. Pat. No. 5,502,113 to Antonelli et al issued Mar. 26, 1996 and U.S. Pat. No. 5,530,070 to Antonelli et al issued Jun. 25, 1996, both incorporated by reference herein, and have been used to form aqueous pigment dispersions and coating compositions containing metallic flake, e.g., aluminum flake, pigment. Although these dispersants are effective in stabilizing metallic flake pigments in waterborne systems, they are not sufficient when used alone in stabilizing transparent iron oxide pigments.

Therefore, there is a need to improve the performance of aqueous coating compositions containing transparent iron oxide pigments, and in particular to find new pigment dispersions for use therein containing dispersing resins that have greater affinity for the transparent iron oxide pigment surface and provide more effective pigment stabilization, and ultimately improve the transparency of coatings formed therefrom and come close to the performance of solvent borne systems.

The present invention teaches a method of using a phosphated acrylic copolymer dispersant, as an auxiliary dispersant, in combination with a traditional transparent iron oxide dispersant to improve the transparency of aqueous coating compositions containing transparent iron oxide pigments. The present invention also teaches a method of using the auxiliary phosphated dispersant as an anchoring polymer which provides anchoring sites for copolymer dispersants with alkyl amino groups to provide a venue for stronger adsorption of polymeric dispersants to the pigment surface and greater coating transparency.

SUMMARY OF THE INVENTION

The present invention relates to an improved aqueous coating composition containing
(a) an aqueous carrier medium:
(b) transparent iron oxide pigment particles stabilized by
(c) a synergistic mixture of acrylic copolymer dispersants consisting essentially of
 (i) an acrylic copolymer dispersant having a hydrophilic stabilizing segment and acid groups in a hydrophobic pigment adsorbing segment
 (ii) an acrylic copolymer dispersant having a hydrophilic stabilizing segment and phosphate groups in a hydrophobic pigment adsorbing segment and
 (iii) optional acrylic copolymer having a hydrophilic stabilizing segment and alkyl amino groups in a hydrophobic pigment adsorbing segment;
wherein the pigment and dispersants are present in a dispersant (i) to pigment weight ratio, D/P, of about 0.1/1 to 1/1, a dispersant (ii) to pigment weight ratio, D/P, of about 0.05/1 to 0.33/1, and a dispersant (iii) to pigment weight ratio, D/P, if present, of about 0.05/1 to 0.2/1;
(d) a film forming polymeric binder; and
(e) a crosslinking agent for the binder.

Pigment dispersions of the forgoing acrylic copolymer combination and process for forming the dispersions also are part of this invention.

DETAILED DESCRIPTION OF THE INVENTION

The novel coating composition of this invention is an aqueous based composition containing 10–70% by weight of film forming polymeric components which include a film forming polymeric binder, a crosslinking agent, and a mixture of specified copolymer dispersants and a corresponding amount of 30–90% by weight of an aqueous carrier which is primarily water. The composition also contains transparent iron oxide pigments. The pigments are introduced in the coating composition in the form of an aqueous pigment dispersion that utilizes the specified mixture of dispersants in a specified amount to stabilize and keep the pigments deflocculated over long periods of time in the dispersion and most notably herein after being added to the coating composition. As a result, the novel coating composition is stable and non-flocculated or agglomerated and has excellent transparency.

Not to be held to any particularly theory, it is thought that the phosphated acrylic copolymer dispersant used in the composition has greater affinity for the iron oxide surface and when it is employed as an auxiliary dispersant alongside a traditional transparent iron oxide dispersant, it improves the overall dispersion stability of transparent iron oxide pigments in aqueous coatings without the negative side effects normally associated with use of phosphated dispersants, such as unwanted increases in dispersion viscosity. By virtue of its A strong adsorption to the iron oxide surface, it is thought the phosphated acrylic copolymer also provides anchoring sites for additional copolymer dispersants with alkyl amino functional groups that bond with functional groups on the anchoring phosphated polymer. This synergism provides a venue for stronger adsorption of polymeric dispersants to the pigment surface which results in further stabilization of the aqueous coating.

Another advantage of this invention is that the copolymer dispersants used in the composition are generally compatible with each other and also with a variety of polymeric film forming binders that are conventionally used in. waterborne coating compositions and in particular, compatible with acrylic polymers that are used in the waterborne coatings. Upon curing of the coating composition, the copolymer dispersants also preferably contain functional groups, such as hydroxyl groups, that react with other film forming components of the coating composition and become a part of the film and do not cause deterioration of the film upon weathering as may occur if it were an unreacted component of the film. The dispersant combination also enables good water-to-solvent borne paint matching as well as better esthetics in color styling.

The coating composition of this invention contains a film forming binder, typically an acrylic polymer and a curing agent, such as a blocked polyisocyanate or an alkylated melamine. These materials provide excellent coating properties desirable for automotive finishes. Waterborne basecoats of conventional basecoat/clearcoat finishes currently used on automobiles and trucks containing a transparent iron oxide pigment dispersion that utilizes the combination of dispersants specified herein have significantly improved transparency and significantly less haze in comparison to basecoats that utilize the conventional transparent iron oxide copolymer dispersants.

More specifically, the dispersant mixture selected for use herein consists essentially of i) at least one acrylic copolymer dispersant having acid groups in the hydrophobic adsorbing portion, ii) at least one acrylic copolymer dispersant containing phosphate groups in the hydrophobic adsorbing portion; and optionally iii) at least one adjunct acrylic copolymer dispersant containing alkyl amino groups preferably along with aryl groups in the hydrophobic portion.

The acrylic copolymer dispersants used herein are water-dispersible in nature. Accordingly, they each include at least one hydrophobic pigment adsorbing segment that interacts with the pigment surface and at least one hydrophilic stabilizing segment that is soluble in the aqueous carrier medium. Not to be held to any particular theory, it is thought that adsorbing segments function, in part, to attach the copolymer dispersant to the pigment surface, while stabilizing segments function, in part, to provide steric stabilization of the pigment particle against flocculation and keep the pigments dispersed in aqueous medium.

The location of the adsorbing segment and the stabilizing segment in each of the acrylic copolymers may vary depending upon the structure of the acrylic copolymer dispersant. Acrylic polymer dispersants of the present invention may be random, block or graft copolymers. A block copolymer used in the present invention may have an AB, ABA, or ABC structure, for example. At least one of the blocks, A, B or C must be an adsorbing segment. At least one of the blocks, A, B or C must be a stabilizing segment. A block copolymer used herein may also include an additional third segment. Graft copolymer dispersants used herein have a backbone segment and at least one side chain segment, preferably a macromonomer, grafted onto the backbone. Either a backbone segment or a side chain segment must be an adsorbing segment. Either a backbone segment or a side chain segment must be a stabilizing segment. Preferably a backbone segment is an adsorbing segment and a side chain segment is a stabilizing segment. Random copolymer dispersants used herein have both adsorbing segments and stabilizing segments randomly placed in a polymer dispersant chain.

The adsorbing segment of each of the forgoing dispersants is hydrophobic relative to the stabilizing segment and is mainly composed of polymerized ethylenically unsaturated hydrophobic monomers, such as alkyl (meth)acrylates, cycloaliphatic (meth)acrylates, and aryl (meth)acrylates as are listed hereinafter. The term (meth)acrylate refers to both the acrylate and methacrylate esters. The adsorbing segment preferably further contains about 1–20% by weight, preferably 1–10% by weight, based on the total weight of the copolymer, of polymerized non-hydrophobic ethylenically unsaturated monomers that either have attached thereto an acid, phosphate, or alkyl amino anchoring group depending on which of the forgoing dispersants is desired.

Examples of monomers that can be used to introduce acid functionality in an adsorbing segment include ethylenically unsaturated carboxylic acids such as acrylic acid and methacrylic acid. Other carboxylic acids that can be used include itaconic acid, maleic acid, and the like. Ethylenically unsaturated sulfonic, sulfinic, phosphoric or phosphonic acid and esters thereof also can be used such as styrene sulfonic acid, 2-acrylamido-2-propane sulfonic acid, vinyl phosphonic acid and its esters, and the like. Monomers containing acid functionality are selected, in part, on their theoretical ability to bind to iron oxide pigments which have basic groups on the surface. The iron oxide surface is complex. Usually there are a wide range of functional groups on the surface in addition to basic groups.

Phosphate groups can be introduced in an adsorbing segment by copolymerizing ethylenically unsaturated glycidyl containing monomers, such as glycidyl acrylate or glycidyl methacrylate, into the adsorbing segment to provide reactive glycidyl groups and subsequently reacting the glycidyl groups with phosphoric acid or phosphorous pentoxide to provide the copolymer with pendant phosphate groups. Monomers having phosphate functionality are selected, in part, on their theoretical ability to irreversibly bind to transparent iron oxide pigments in aqueous environments.

Examples of monomers that can be used to introduce alkyl amino functionality in an adsorbing segment include alkyl amino alkyl methacrylate monomers having 1 to 4 carbon atoms in the alkyl group such as. dimethylaminoethyl methacrylate, diethylaminoethyl methacrylate, dipropylaminoethyl methacrylate, dibutylaminoethyl methacrylate.

Also, it is not necessary that the anchoring groups mentioned above all be incorporated in the hydrophobic part of the copolymer but can be incorporated in the hydrophilic part as well.

Examples of hydrophobic monomers that can be used to form the rest of the adsorbing segment include alkyl (meth) acrylates having 1–12 carbon atoms in the alkyl group, such as methyl acrylate, ethyl acrylate, propyl acrylate, isopropyl acrylate, butyl acrylate, pentyl acrylate, hexyl acrylate, 2-ethylhexyl acrylate, isopropyl acrylate, butyl acrylate, pentyl acrylate, hexyl acrylate, 2-ethylhexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethylhexyl methacrylate, nonyl methacrylate, lauryl methacrylate, and the like, and any mixtures thereof. Cycloaliphatic (meth)acrylates can also be used such as trimethylcyclohexyl methacrylate, isobutylcyclohexyl methacrylate, and the like. Aryl (meth)acrylates can also be used such as benzyl (meth)acrylate, napthyl (meth)acrylate, phenoxy (meth)acrylate, and the like. Mixtures of any of the above may also be used. Other polymerizable monomers that can be used are styrene, alpha methyl styrene, methacrylamide and methacrylonitrile.

The hydrophilic stabilizing segment of each dispersant used herein is soluble in the selected aqueous carrier medium. It is composed mainly of polymerized ethylenically unsaturated hydrophilic monomers. Acid containing monomers, such as acrylic acid and methacrylic acid and 2-acrylamido-2-propane sulfonic acid, can be used. Some useful examples of acid containing monomers include the acids listed hereinabove. Non-ionic hydrophilic monomers can also be used to form the stabilizing segment such as monoethylenically unsaturated poly(alkylene glycol) monomers such as poly(ethylene glycol) mono(meth)acrylate (weight average molecular weight of 200–4000, preferably 200–2000), and the like. In addition to the forgoing monomers, up to 40% by weight, based on the weight of the stabilizing segment, of other commonly used hydrophobic monomers can be copolymerized into the stabilizing portion provided they are used at a concentration that will not drastically change the solubility properties of the stabilizing portion in the selected aqueous processing medium. Some useful examples include the alkyl(meth)acrylates listed hereinabove.

Either or both the stabilizing or adsorbing segment, preferably the stabilizing segment, of each dispersant used herein also may contain up to 30% by weight, based on the weight of the copolymer, of ethylenically unsaturated hydrophilic monomers that have functional groups that will react with the film forming components present in the coating composition which in turn enable the dispersant to become a permanent part of the network structure. Suitable monomers include hydrophilic hydroxyl alkyl (meth)acrylate monomers having 1 to 4 carbon atoms in the alkyl group, such as hydroxy ethyl acrylate, hydroxy ethyl methacrylate, and the like.

The acrylic copolymer dispersants used herein have a number average molecular weight of about 4,000 to about 25,000 (preferably about 5,000 to about 20,000). The adsorbing segment typically has a number average molecular weight of about 2,000 to about 10,000 (preferably about 4,000 to about 7,000). The stabilizing segment typically has a number average molecular weight of about 2,000 to about 15,000 (preferably about 4,000 to about 7,000). All molecular weights referred herein are determined by GPC (gel permeation chromatography) using a polystyrene standard. The adsorbing segment typically comprises about 20–80% by weight of the polymer, and correspondingly the stabilizing segment typically comprises about 80–20% by weight of the polymer.

The forgoing dispersants may be prepared by a variety of well known solution polymerization techniques devised for a particular structure, such as by the GTP (Group Transfer Polymerization) method reported in U.S. Pat. No. 4,656,226; by the standard anionic or the free radical polymerization method reported in U.S. Pat. No. 4,656,226; or by the SCT (Special Chain Transfer) method reported in U.S. Pat. No. 5,231,131, all incorporated herein by reference. The GTP method is traditionally used to form block copolymers. Using this method, it is generally recommended to block any acid or hydroxyl containing monomers to prevent side reactions during polymerization. Following polymerization, the acid and hydroxyl groups are unblocked by a reaction with alcohol or water. The SCT method is traditionally used to form the macromonomer portion of a graft copolymer. Macromonomers can also be supplied by other means. Standard anionic polymerization is oftentimes used to form random copolymers.

After each of the forgoing copolymers is formed, typically an amine or inorganic base such as ammonium hydroxide are added to the copolymers to neutralize unreacted or residual acid constituents and make the copolymers more easily dispersible in aqueous medium. Primary and secondary amines can be used. One preferred amine is 2-amino methyl propanol. These above neutralization agents are typically added during the pigment dispersion process described below.

To form a pigment dispersion, transparent iron oxide pigment is added to the specified copolymers in the customary water-soluble organic solvent or blend, followed by the addition of an amine or an inorganic base to neutralize the copolymers, and then water is added to form an aqueous dispersion. Conventional mixing is used to form the dispersion, such as high speed mixing, ball milling, sand grinding, attritor grinding, or two or three roll milling. Mixing is generally carried out for about 5–150 minutes to form a dispersion having a low shear viscosity of about 100–1,000 centipoise and preferably about 100–500 centipoise at 5 and 100 rpm measured on a Brookfield Viscometer at ambient temperatures.

The pigment dispersion so formed contains about 10–30% by weight of pigment and dispersant and correspondingly about 90–70% by weight of an aqueous carrier and has an overall dispersant to pigment weight ratio, (D/P), of about 0.1/1 to 1/1. The acid containing dispersant (i) to pigment weight ratio, D/P is about 0.25/1 to 0.75 to 1 and preferably about 0.33/1 to 0.5/1. The phosphate containing dispersant (ii) to pigment ratio, D/P is about 0.05/1 to 0.45/1 and is preferably about 0.5/1 to 0.15/1. The alkyl amino containing dispersant (iii) to pigment ratio, D/P if present, is about 0.05/1 to 0.5/1 and is preferably 0.05/1 to 0.15/1. The overall dispersant to pigment ratio, D/P is the sum total of D/P contribution from each dispersant. Film properties indicate overall D/P are optimal in range of 0.4/1 up to 0.7/1 and preferentially 0.6/1.

Any of the conventional transparent iron oxide pigment of various colors can be used to form the pigment dispersion, for example "AC-1005" (red) from Johnson-Matthey and "L-1916" (yellow) from BASF. Such pigments are typically 0.1 microns or less. Use of transoxide pigments in aqueous systems containing aluminum flake can induce hydrogen gassing. The transoxide pigment competes for phosphated passivator resins on the aluminum pigment surface. Use of phosphated dispersing resin in this invention, in dispersion formulation, mitigates this effect.

Under some circumstances, it may be desirable to form pigment dispersions by using the dispersant mixture that do not contain transparent iron oxide pigments but contain pigments used in paints in particular waterborne paints that have affinity to phosphate groups in the dispersant molecule, such as opaque iron oxide of various colors and other metallic oxides like titanium dioxide, zinc oxide, and the like.

The coatings compositions of this invention contain in addition to the pigment dispersion a binder preferably of an acrylic-based polymer and a crosslinking agent such as a melamine crosslinking agent, a polyisocyanate crosslinking agent or a blocked polyisocyanate crosslinking agent in an aqueous medium. The acrylic copolymers form stable solutions or dispersions. These coating compositions also contain about 10–70%, more typically 15–50% by weight of binder, and about 30–90%, more typically 50–85% by weight, of the liquid carrier which is water alone or a mixture of mainly water and customary water-soluble organic solvent or blend. Suitable coating compositions are prepared by blending other useful components in accordance with normal paint formulation techniques.

The acrylic based polymer binders typically are polymers of alkyl (meth)acrylates having 1–12 carbon atoms in the alkyl group, hydroxy alkyl (meth) acrylates having 1–4 carbon atoms in the alkyl group and methacrylic or acrylic acid and have a number average molecular weight of 5,000–30,000 and are neutralized with ammonium hydroxide or an amine to form aqueous solutions or dispersions. The aforementioned alkyl (meth)acrylates, hydroxy alkyl (meth)acrylates can be used to formulate these polymers.

To form a coating composition which will crosslink under elevated baking temperatures of about 60–180° C. for about 5–60 minutes, about 10 to 50%, preferably 15 to 30% by weight, based on the weight of the binder, of an alkylated melamine formaldehyde crosslinking agent having 1–4 carbon atoms in the alkylated group is preferred.

These crosslinking agents are generally partially or fully alkylated melamine formaldehyde compounds and may be monomeric or polymeric as described above. Blocked polyisocyanates can also be used as crosslinking agents. Coating compositions containing a melamine crosslinking agent can contain about 0.1 to 1.0% by weight, based on the weight of a binder, of a strong acid catalyst or a salt thereof to lower curing temperatures and time. Aromatic sulfonic acids such as para toluene sulfonic acid or its ammonium salt are preferred catalysts. Other catalysts that can be used are dodecyl benzene sulfonic acid, phosphoric acid and amine or ammonium salts of these acids.

Other film forming polymers can also be used in these coating compositions such as acrylourethanes, polyesters and polyester urethanes, polyethers and polyether urethanes that are compatible. A polyisocyanate may be used as a crosslinking agent to provide a coating composition that will cure at ambient temperatures.

In addition, coating composition of the present invention may contain a variety of other optional ingredients, including pigments, fillers, plasticizers, antioxidants, surfactants and flow control agents.

To improve weatherability of a finish of the novel coating compositions, an ultraviolet light stabilizer or a combination of ultraviolet light stabilizers can be added in the amount of about 0.1–5% by weight, based on the weight of the binder. The stabilizer may be added for example to the pigment dispersion or may be added directly to the coating composition. Such stabilizers include ultraviolet light absorbers, screeners, quenchers, and specific hindered amine light stabilizers. Also, an anitoxidant can be added, in the amount of 0.1–5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

Such coating composition may also include conventional formulation additives such as flow control agents, for example, "Resiflow" S (polybutylacrylate), BYK 320 and 325 (high molecular weight polyacrylates); rheology control agents, such as fumed silica and thickeners such as the Acrylsol® copolymers from Rohm & Haas.

Apart from transparent iron oxide pigments, the coating composition of this invention can also include any of the other conventional pigments used in paints in particular waterborne paints such as metallic flakes like aluminum flake, bronze, nickel stainless steel flakes and the like, pearlescent flakes like coated mica flakes such as mica flakes coated with titanium dioxide and the like, as well as carbon black, filler pigments such as talc, china clay, barytes, carbonates, silicates, metallic oxides such as titanium dioxide, opaque iron oxides of various colors, and zinc oxide; carbon black, and a wide variety of organic pigments such as quinacridones, phthalocyanines, perylenes, azo pigments, indanthrones, carbazoles such as carbazole violet, isoindolinones, isoindolones, thioindigo reds, benzimidazolinones, and the like. Metallic flakes like aluminum flake is preferred. These pigments may be provided in aqueous dispersions stabilized by conventional dispersants and not necessarily by the combination listed hereinabove.

The coating compositions of the present invention may be utilized as a monocoat or in a pigmented colorcoat or basecoat over which a clearcoat is applied to provide a colorcoat/clearcoat finish.

Coating compositions of this invention have excellent adhesion to a variety of metallic or non-metallic substrates, such as previously painted substrates, primed substrates, cold rolled steel, phosphatized steel, and steel coated with conventional electrodeposition primers. These coating compositions can be used to coat plastic substrates such as polyester reinforced fiberglass, reaction injection-molded urethanes and partially crystalline polyamides. In particular, base coat or color coat composition of this invention, provide improved transparency and reduced haze and improved paint stability, which properties are very important property for coatings used on automobiles and trucks.

Coating compositions of this invention can be applied by conventional techniques such as spraying, electrostatic spraying, dipping, brushing, flowcoating and the like. The preferred techniques are spraying and electrostatic spraying. In OEM applications, the composition typically is baked at 100–150° C. for about 15–30 minutes to form a coating about 0.1–3.0 mils thick. When the composition is used as a clearcoat, it is applied over the color coat that may be dried to a tack-free state and cured or preferably flash dried for a short period before the clearcoat is applied. The color coat/clearcoat finish is then baked as mentioned above to provide a dried and cured finish. The present invention is also applicable to non-baking refinish systems, as will be readily appreciated by those skilled in the art.

It is customary to apply a clear topcoat over a basecoat by means of a "wet-on-wet" application, i.e., the topcoat is applied to the basecoat without curing or completely drying the basecoat. The coated substrate is then heated for a predetermined time period to allow simultaneous curing of the base and clear coats.

The following Examples illustrate the invention. All parts, ratios and percentages are on a weight basis unless otherwise indicated. All molecular weights disclosed herein are determined by GPC (gel permeation chromatography) using a polystyrene standard.

EXAMPLES

Polymer dispersants were prepared and formulated into a pigment dispersion and the pigment dispersion was formulated into a transparent coating composition.

Polymer Dispersant 1

Polymer Dispersant 1 is an example of a random acrylic copolymer containing acid functionality in the pigment adsorbing segment composed of methyl methacrylate (MMA), butyl acrylate (BA), acrylic acid (AA), 2-hydroxy ethyl methacrylate (HEMA) and 2-acrylamido-2-methyl propane sulfonic acid (AMPS) in a weight ratio of 37.5/50.2/5.1/5.1/2.1 having a number average molecular weight of 20,000 and a polydispersity of 2. This polymer was made using a standard anionic polymerization process as described in U.S. Pat. No. 4,656,226, herein incorporated by reference. The polymer solution was neutralized with 2-amino methyl propanol and diluted with deionized water and isopropanol to a solids content of 50% prior to use.

Polymer Dispersant 2

Polymer Dispersant 2 is an example of a phosphated graft copolymer containing phosphate functionality in the pigment adsorbing backbone segment and prepared using a standard free radical polymerization approach. The resulting phosphated graft copolymer had the following composition:

[60] NBA/MA/GMA-Phosphated (45.5/45.5/9)//[40] Bisomer 20W

The phosphate polymer was prepared using the macromonomer, Bisomer 20W as the stabilizing arms of the graft copolymer. This material is a macromonomer of poly (ethyleneglycol monomethacrylate) which is purchased from ISC. It is nonionic with a molecular weight, Mw of 2000 and provides the water soluble functionality to the polymer. The Bisomer 20W macromonomer along with other constituents are reacted in a vessel to form the macro branched graft copolymer.

The graft copolymer was formed by charging a reactor equipped with a stirrer, thermocouple, condenser and nitrogen blanket and heating to reflux. To the reactor the backbone monomers of n-butyl acrylate (NBA), glycidyl methacrylate (GMA), methyl acrylate (MA) and the Bisomer 20W macromonomer were added with isopropanol as the solvent. The polymerization reaction was initiated by feeding the initiator 2,2'-azobis(2,4-dimethylvaleronitrile) (Vazo® 52 from DuPont Co., Wilmington, Del.) which was dissolved in a solution of methyl ethyl ketone and isopropanol. The phosphating was accomplished by an esterification of the epoxy groups on glycidyl methacrylate with phosphoric acid, $H_3PO_4$.

The resulting phosphate acrylic graft copolymer reached 99% conversion. Its solids was 45% in a solution of water/isopropanol. The molecular weight of the polymer was obtained using GPC. The polymer was methylated prior to injection into the column. The GPC indicated a number average molecular weight of 4,577 and a polydispersity of 2.64.

Polymer Dispersant 3

Polymer Dispersant 3 is an example of an AB block copolymer containing benzyl functionality and alkyl amino functionality in the adsorbing segment and prepared using the GTP method.

The AB block copolymer was prepared by charging to a 5-liter flask equipped with an agitator, condenser, heating mantle, nitrogen inlet, thermocouple and an addition port, 1,600 g of tetrahydrofuran and 3.8 g of p-xylene, followed by 0.6 mL of a 1.0 M solution of a catalyst, tetrabutylammonium m-chlorobenzoate in acetonitrile. 32.5 g of a 0.140 M solution of an initiator, 1,1-bis(trimethylsiloxy)-2-methylpropene, were injected into the flask. Feed I, consisting of 0.6 mL of a 1.0 M solution of tetrabutylammonium m-chlorobenzoate in acetonitrile, was started and added over 200 minutes. Feed II, consisting of 265.0 g (1.67 mol) of trimethylsilyl methacrylate, 298.0 g (2.10 mol) of butyl methacrylate, 140.0 g (1.40 mol) of methyl methacrylate, and 141.0 g (0.70 mol) of trimethylsiloxyethyl methacrylate, was started at 0.0 minutes and added over a 45 minute period. One hundred minutes after Feed II was completed, over 99% of the monomers had reacted. Feed III, consisting of 616.0 g (3.46 mol) of benzyl methacrylate, and 154.0 g (0.98 mol) of dimethylaminoethyl methacrylate, was started and added over 30 minutes. After 400 minutes, 150 g methanol was added to the resulting reaction mixture to quench the reaction and deblock the hydroxy and acid monomers and solvent distillation was started. During the first stage of distillation, 400.0 g of solvent were removed. 100 g of methanol were added and an additional 200.0 g of solvent were distilled off.

The resulting polymer solution had a solids content of 50% and the polymer had the following composition: benzyl methacrylate (BZMA)/dimethylaminoethyl methacrylate (DMEAMA)//BMA/MMA/hydroxyethyl methacrylate (HEMA)/methacrylic acid (MAA) in a monomer ratio of 25/7//15/10/5/12. The polymer had a number average molecular weight of 9,400 and a polydispersity of 1.1. The polymer solution was diluted with a 1:1 mixture of deionized water and isopropyl alcohol to a solids content of 30% prior to use.

Evaluation of Pigment Dispersion Properties

The pigment dispersion samples were prepared by the following procedure. Laboratory grinds were performed using standard 01 attritors which are described in *Paint Flow and Pigment Dispersion* by Temple C. Patton, pages 439–441, Wiley Interscience Publication, 1979. Each grind was loaded with 400 grams of the experimental dispersion and milling was accomplished with 850 grams of 0.8–1.0 mm high density zirconia media. Each attritor was milled for a total of 24 hours at 500 rpm spindle agitation to ensure that adequate milling was achieved.

Included in the experimental design was one control. The control was a dispersion made with the existing transparent iron oxide dispersant (Polymer Dispersant 1), which gave a basepoint for existing technology. The remaining experiments determined the optimal level of phosphate dispersant which gave improved dispersion and paint performance.

The red and yellow transparent iron oxide ("transoxide") dispersion formulations, (Ex), each had the following compositions:

|  | CEx.1 | Ex.2 | Ex.3 | Ex.4 | Ex.5 | Ex.6 | Ex.7 |
| --- | --- | --- | --- | --- | --- | --- | --- |
| Deionized Water | 69.45 | 66.95 | 64.45 | 59.45 | 54.45 | 59.45 | 64.45 |
| Transoxide pigment | 15.00 | 15.00 | 15.00 | 15.00 | 15.00 | 15.00 | 15.00 |
| Polymer Dispersant 1 | 15.00 | 15.00 | 15.00 | 15.00 | 15.00 | 12.50 | 10.00 |
| Polymer Dispersant 2 | 0.00 | 2.50 | 5.00 | 10.00 | 15.00 | 12.50 | 5.00 |
| Polymer Dispersant 3 | 0.00 | 0.00 | 0.00 | 0.00 | 0.00 | 0.00 | 5.00 |
| Defoamer | 0.30 | 0.30 | 0.30 | 0.30 | 0.30 | 0.30 | 0.30 |
| Aminomethylpropanol | 0.25 | 0.25 | 0.25 | 0.25 | 0.25 | 0.25 | 0.25 |
| Total | 100.00 | 100.00 | 100.00 | 100.00 | 100.00 | 100.00 | 100.00 |

The dispersion CEx.1 is the control. The dispersion, Ex.2 was made only for Yellow transoxide pigment, BASF L-1916. The Red transoxide used was Johnson Matthey AC-1005. The resin solids for Polymer Dispersant 1 is 50%, for Polymer Dispersant 2 is 45% and for Polymer Dispersant 3 is 30%. The amount of each dispersant applied to the pigment is reported as D/P which is the dispersant to pigment weight ratio.

Results

The experimental results are given in Tables 1, 2, 3 and 4. A dispersion pigment loading of 15.00% was used to provided adequate screening between 01 attritor grinds. In analyzing each grind and comparing versus control, the key product characteristics used included: (i) dispersion viscosity, (ii) dispersion haze and transparency, and (iii) the paint letdown haze/transparency and stability.

The desired attributes of the dispersion include: (i) high pigment loading, (ii) low viscosity, and (iii) low haze and high transparency. The dispersion viscosity is measured using a standard Brookfield Viscometer at low shear, 5 rpm and higher shear, 100 rpm. The haze and transparency of the dispersion are measured using a drawdown on Mylar and reading the panel using the Hunter Colorquest Instrument.

A good dispersion is a necessary but not sufficient condition for making good paint. A good dispersion must also work well and produce the desired aesthetics when used in an aqueous paint system. To make this assessment, each dispersion sample was letdown into a balanced clear paint formulation. The balanced clear, BC-1, used had the following composition:

| Balanced Clear, BC-1 | Weight Percent |
| --- | --- |
| Acrylic Latex (32.7% solids in an aqueous medium of polymer of allyl methacrylate/methyl methacrylate/methacrylic acid/hydroxy ethyl acrylate/butyl acrylate) | 58.40 |
| Water | 15.90 |
| Aminomethylpropanol | 0.32 |
| Polyester Solution (89% solids in butoxyethanol of a polyester of neopentyl glycol/trimethyl porpane/1,6 hexanediol/isophthalic acid/phthalic anhydride/adipic acid/1,12 dodecane dioic acid) | 5.96 |
| "Cymel" 301 (methylated melamine crosslinking agent from Cytec Industries) | 6.05 |
| Agitan 281 (defoamer) | 1.10 |
| Mineral Spirits | 6.60 |
| Butoxyethanol | 1.66 |

-continued

| Balanced Clear, BC-1 | Weight Percent |
| --- | --- |
| Hexoxyethanol | 2.94 |
| Nacure XP-221 (aromatic sulfonic acid catalyst) | 0.12 |
| ASE-60 (acrylic emulsion polymer thickener) | 0.95 |
| Total | 100.00 |

The paint evaluations were performed by adding 6 g of the dispersion to 20 grams of balanced clear, BC-1, mixing thoroughly, and drawing the paint onto Mylar film with a #20 WWR, (Wire Wound Rod). After the film is dried, a Clearcoat was applied over the film with a #20 WWR. The sample was oven cured at 250° F. for 30 minutes. After cooling, the haze and transparency was read using the Hunter ColorQuest. The procedure for dispersion letdown and haze/transparency measurement are described more fully in DuPont Co., Wilmington, Del., Procedure, TM-0501A.

Yellow Transoxide Results

The results for the yellow transoxide pigment, BASF L-1916 are shown in Table 1. The paint letdown haze in BC-1 as a function of the percent phosphate resin in the dispersion shows that the haze of the Control which contains no phosphate resin, has the highest letdown haze (14.43%). The grinds Ex.2 through Ex.5 with standard transoxide dispersant at D/P=0.50 with additional phosphate resin ranging from D/P=0.075 up through D/P=0.45 show that sample 2 with D/P=0.075 phosphate resin gave the lowest haze with the haze increasing slightly as the level of phosphate resin is increased. The results also show that the dispersion viscosity increases rapidly as phosphate resin level is increased. Based on the results, a loading of phosphate resin, polymer dispersant 2, at D/P between 0.075 and 0.15 in the dispersion appears to be optimal based on 1-letdown haze and dispersion viscosity.

Red Transoxide Results

A similar set of dispersion grinds was performed for the red transoxide pigment, Johnson Matthey, AC-1005. These results also show the same trend of increasing dispersion viscosity with increasing phosphate level. The dispersions were letdown into BC-1

The results in Table 2 show that CEx. 1, the Control, which contains no phosphate resin had the highest letdown haze. The letdown haze showed the same slow increase with increasing phosphate level. The dispersion viscosity shows the same rapid increase with phosphate level as well. A grind was not made with a phosphate resin level less than 5.0%. Further optimization grinds may be required to establish the optimal level required which may be less than 5.0%.

In addition to reducing the letdown haze another key product characteristic is the viscosity and transparency stability of the letdown. This is also an important consideration because the paint may sit for several weeks or months before a customer may actually use the paint. Therefore, the conditions of paint stability look at increasing viscosity of the letdown due to phase separation or increasing haze due to flocculation over time. Since this is also a key product characteristic, the yellow and red transoxide letdowns were examined and remeasured for haze at 1 and 3 week intervals. The results in Table 3 and 4 show that there was no significant haze increase with any sample which indicates good paint stability.

Three Dispersant System

One last experiment was performed in which a three dispersant system was evaluated for both the red and yellow transoxide pigments. Use of the phosphated comb (graft) improved performance in paint but there was a noticeable increase in dispersion viscosity. At elevated viscosities dispersion milling becomes difficult and yield loss due to clingage is high. The use of polymer dispersant 3 at D/P of 0.1, showed additional transparency benefit and unexpected improvement in reducing dispersion viscosity and rheology. Optimal dispersion viscosity for milling large batches in high throughput mills is about 100 to 500 centipoise at 5 and 100 rpm on a Brookfield Viscometer. These last experiments which are reported in Table 1 and Table 2 for the yellow and red transoxide, respectively examine a three dispersant combination. In the dispersion formulations the existing transoxide dispersant, polymer dispersant 1, was reduced from D/P of 0.50 to 0.33. The phosphated comb, polymer dispersant 2, was held at 0.15 and a third, polymer dispersant 3 which is a benzyl and amine functional polymer was introduced at D/P of 0.10 loading as well. The results in Tables 1 and 2 indicate that these dispersion formulations not only have the lowest haze in dispersion and letdown but also has a lower dispersion viscosity. These results indicate transoxide pigment surfaces are complex and achieving optimal stabilization using conventional wet milling processes is not easy.

The results demonstrate that phosphated graft copolymer dispersing resin improved the stabilization of both red and yellow transoxide pigments for aqueous paint systems. The dispersion formulation work shows that the pigment loading can be significant which should help address the color styling issue. The letdown and paint stability data also show that using the phosphate resin as an anchor resin on the pigment surface with a codispersant such as dispersant 3, which bonds with the anchor resin significantly improved transoxide performance in aqueous paint systems.

Various modifications, alterations, additions or substitutions of he components if the compositions of this invention will be apparent to those skilled in the art without departing from the spirit and scope of this invention. This invention is not limited by the illustrative embodiments set forth herein, but rather is defined by the following claims.

TABLE I

Yellow Transoxide, BASF L-1916

| No. | Phosphated Graft Dispersant 2 (D/P) | Standard Transoxide Dispersant Dispersant 1 (D/P) | GTP Benzyl/Amine AB-Dispersant Dispersant 3 (D/P) | Dispersion Viscosity (5 rpm/100 rpm) | Dispersion haze/trans | Paint Letdown haze/trans BC-1 | Comments |
|---|---|---|---|---|---|---|---|
| 1 | 0.00 | 0.50 | 0.00 | 184/168 | 1.66/68.07 | 14.43/64.79 | Control |
| 2 | 0.075 | 0.50 | 0.00 | 232/195 | 0.82/78.12 | 4.09/71.84 | |
| 3 | 0.15 | 0.50 | 0.00 | 856/225 | 1.46/69.74 | 4.70/73.25 | |
| 4 | 0.30 | 0.50 | 0.00 | 4660/523 | 2.15/70.27 | 4.88/69.89 | |
| 5 | 0.45 | 0.50 | 0.00 | 4740/587 | 2.99/68.57 | 5.37/70.98 | |
| 6 | 0.38 | 0.40 | 0.00 | 5580/571 | 3.38/67.90 | 9.43/62.02 | |
| 7 | 0.15 | 0.33 | 0.10 | 136/162 | 1.03/69.84 | 2.32/77.73 | |

TABLE 2

Red Transoxide, Johnson Matthey AC-1003

| No. | Phosphated Graft Dispersant 2 | Standard Transoxide Dispersant Dispersant 1 | GTP Benzyl/Amine AB-Dispersant Dispersant 3 | Dispersion Viscosity (5 rpm/100 rpm) | Dispersion haze/trans | Letdown haze/trans BC-1 | Comments |
|---|---|---|---|---|---|---|---|
| 1 | 0.00 | 15.00 | 0.00 | 20/32 | 2.10/21.84 | 12.37/30.50 | Control |
| 2 | | | | | | | Not Made |
| 3 | 0.15 | 0.50 | 0.00 | 1080/248 | 1.50/23.81 | 4.13/36.37 | |
| 4 | 0.30 | 0.50 | 0.00 | 2096/292 | 3.09/22.51 | 5.81/33.85 | |
| 5 | 0.45 | 0.50 | 0.00 | 3450/442 | 2.69/22.95 | 6.19/34.84 | |
| 6 | 0.38 | 0.42 | 0.00 | 744/207 | 2.87/22.53 | 6.54/34.45 | |
| 7 | 0.15 | 0.33 | 0.10 | 120/122 | 1.08/22.77 | 3.98/37.49 | |

TABLE 3

Paint Letdown Stability of Yellow Transoxide

| Rx. No. | Phosphated Graft Dispersant 2 D/P | Standard Transoxide Dispersant 1 D/P | GTP Benzyl/Amine AB-Dispersant Dispersant 3 D/P | Paint Letdown haze/trans (Day 1) | Paint Letdown haze/trans (3 Weeks) |
|---|---|---|---|---|---|
| 1 | 0.00 | 0.50 | 0.00 | 14.43/64.79 | 10.58/73.05 |
| 3 | 0.15 | 0.50 | 0.00 | 4.70/73.25 | 3.91/79.76 |
| 4 | 0.30 | 0.50 | 0.00 | 4.88/69.89 | 3.71/75.92 |
| 6 | 0.38 | 0.42 | 0.00 | 9.43/62.02 | 4.86/73.22 |
| 7 | 0.15 | 0.33 | 0.10 | 2.32/77.73 | '2.15/79.65 |

TABLE 4

Paint Letdown Stability of Red Transoxide

| Rx. No. | Phosphated Graft Dispersant 2 D/P | Standard Transoxide Dispersant 1 D/P | GTP Benzyl/Amine AB-Dispersant Dispersant 3 D/P | Paint Letdown haze/trans (Day 1) | Paint Letdown haze/trans (3 Weeks) | Comments |
|---|---|---|---|---|---|---|
| 1 | 0.00 | 0.50 | 0.00 | 12.37/30.50 | 10.75/33.84 | Control |
| 3 | 0.15 | 0.50 | 0.00 | 4.13/36.37 | 3.55/43.62 | |
| 4 | 0.30 | 0.50 | 0.00 | 5.81/33.85 | 4.49/41.79 | |
| 6 | 0.38 | 0.42 | 0.00 | 6.54/34.45 | 3.98/40.61 | |
| 7 | 0.15 | 0.33 | 0.10 | 3.98/37.49 | 3.05/44.25 | |

We claim:

1. An aqueous coating composition comprising:
   (a) an aqueous carrier medium;
   (b) transparent iron pigment particles stabilized by
   (c) a mixture of pigment dispersants consisting essentially of
      (i) at least one acrylic copolymer dispersant having a hydrophilic stabilizing segment and acid groups in a hydrophobic adsorbing segment;
      (ii) at least one acrylic copolymer dispersant having a hydrophilic stabilizing segment and phosphate groups in a hydrophobic adsorbing segment; and
      (iii) optionally at least one acrylic copolymer dispersant having a hydrophilic stabilizing segment and alkyl amino groups in a hydrophobic adsorbing segment;
   (d) a film forming polymeric binder; and
   (e) a crosslinking agent for the binder.

2. The coating composition of claim 1 wherein the pigment and dispersants are present in a
   dispersant to pigment, D/P (i) weight ratio of 0.1/1 to 1/1;
   dispersant to pigment, D/P (ii) weight ratio of 0.05/1 to 0.33/1; and
   dispersant to pigment, D/P (iii) weight ratio of 0.05/1 to 0.20/1.

3. The coating composition of claim 1 wherein the acrylic copolymer dispersants have a number average molecular weight of about 4,000–25,000.

4. The coating composition of claim 1 wherein the composition also contains aluminum flake pigment.

5. The coating composition of claim 1 wherein the acrylic copolymer dispersants contain hydroxyl groups in their stabilizing segment that on curing will react with the crosslinking agent.

6. The coating composition of claim 1 wherein the phosphated dispersant comprises an acrylic graft copolymer having a polymeric backbone and macromonomer side chains attached to the backbone, wherein the backbone is a hydrophobic polymer consisting essentially of polymerized alkyl (meth)acrylate monomers having 1–12 carbon atoms in the alkyl group and glycidyl (meth)acrylate monomers, with the glycidyl groups being reacted with phosphoric acid or phosphorous pentoxide, and the side chains consist essentially of hydrophilic poly(ethylene glycol) mono(meth)acrylate macromonomers attached to the backbone.

7. The coating composition of claim 6 wherein the acid containing dispersant comprises a random acrylic copolymer consisting essentially of polymerized alkyl (meth)acrylate monomers having 1–12 carbon atoms in the alkyl group, acrylic acid or methacrylic acid, hydroxy alkyl (meth)acrylate monomers having 1–4 carbon atoms in the alkyl group, and a 2-acrylamido-2-methyl propane sulfonic acid monomer.

8. The coating composition of claim 7 wherein the alkyl amino containing dispersant comprises an acrylic AB block copolymer wherein the hydrophobic A segment consists essentially of benzyl (meth)acrylate monomers and alkyl amino (meth)acrylate monomers having 1–4 carbon atoms in the alkyl group and the hydrophilic B segment consists essentially of polymerized alkyl (meth)acrylate monomers having 1–12 carbon atoms in the alkyl group, acrylic acid or methacrylic acid, and hydroxy alkyl (meth)acrylate monomers having 1–4 carbon atoms in the alkyl group.

9. The coating composition of claim 1 wherein the crosslinking agent comprises an alkylated melamine crosslinking agent and the film forming polymeric binder is an acrylic polymer comprising an alkyl (meth)acrylate having 1–12 carbon atoms in the alkyl group, hydroxyl alkyl (meth)acrylate having 1–4 carbon atoms in the alkyl group and acrylic acid or methacrylic acid.

10. An aqueous pigment dispersion comprising pigment and a mixture of copolymer dispersants consisting essentially of at least one acrylic copolymer dispersant having a hydrophilic stabilizing segment and acid groups in a hydrophobic adsorbing segment and at least one acrylic copolymer dispersant having a hydrophilic stabilizing segment and phosphate groups in a hydrophobic adsorbing segment and optionally at least one acrylic copolymer dispersant having a hydrophilic stabilizing segment and alkyl amino groups in a hydrophobic adsorbing segment.

11. The dispersion of claim 1 wherein the pigment comprises transparent iron oxide.

12. A substrate coated with a dried and cured layer of the composition of claim 1.

13. The substrate of claim 11 having superimposed thereon a clear layer of a coating composition.

* * * * *